June 5, 1962 L. V. GRAY ET AL 3,038,121
ELECTRIC WATCH ANALYZER
Filed Aug. 1, 1960 2 Sheets-Sheet 1
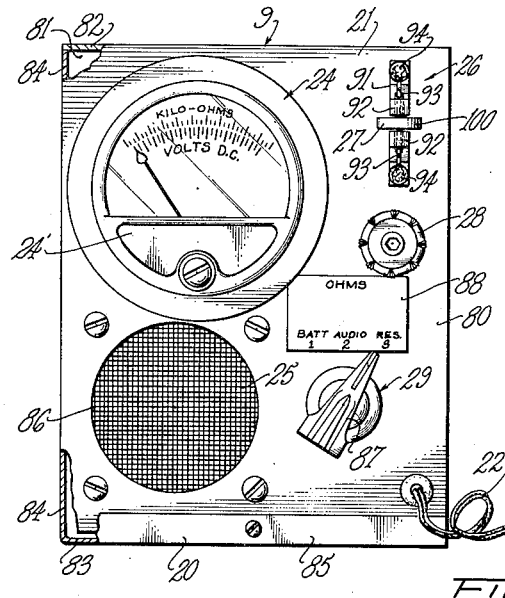
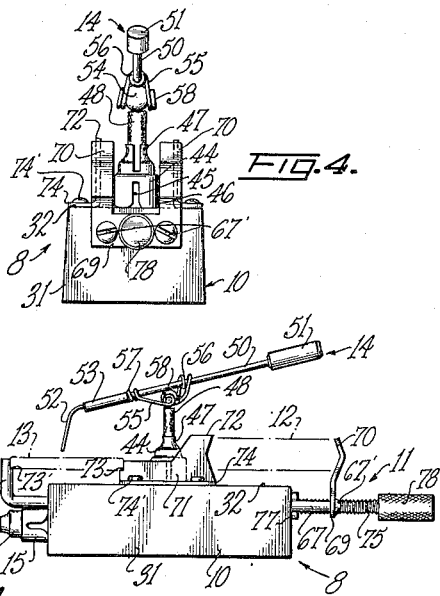
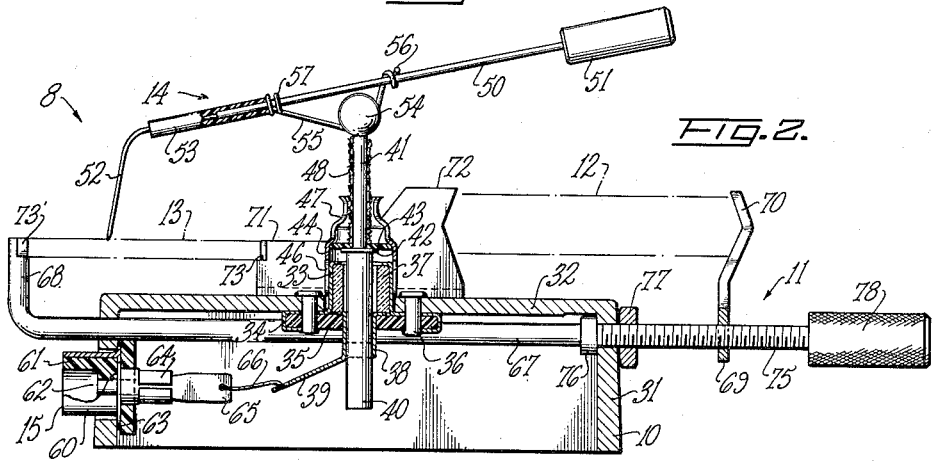
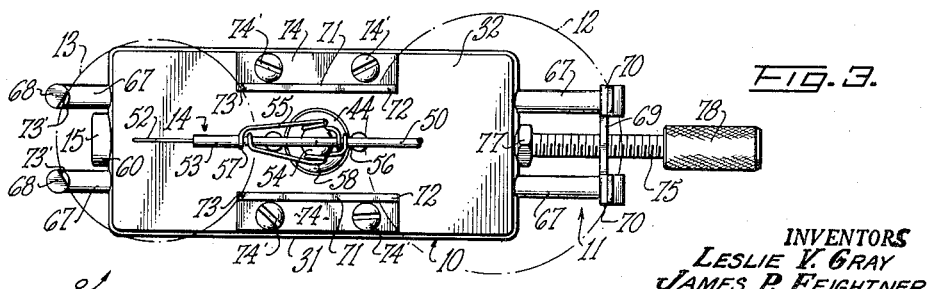
INVENTORS
LESLIE V. GRAY
JAMES P. FEIGHTNER
BY
ATTORNEY

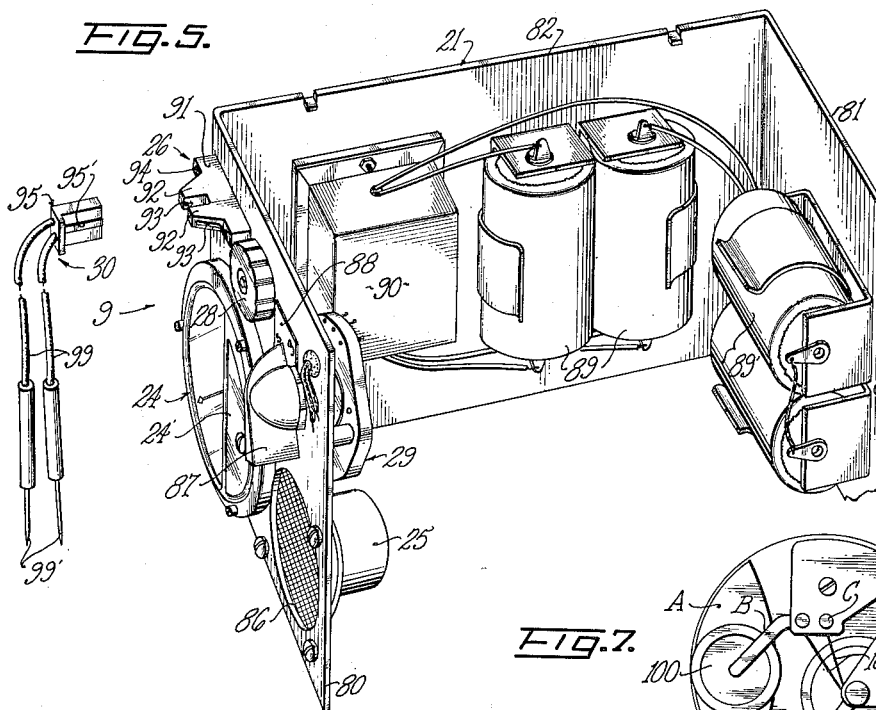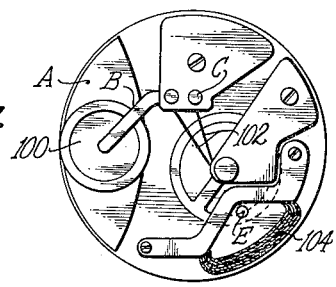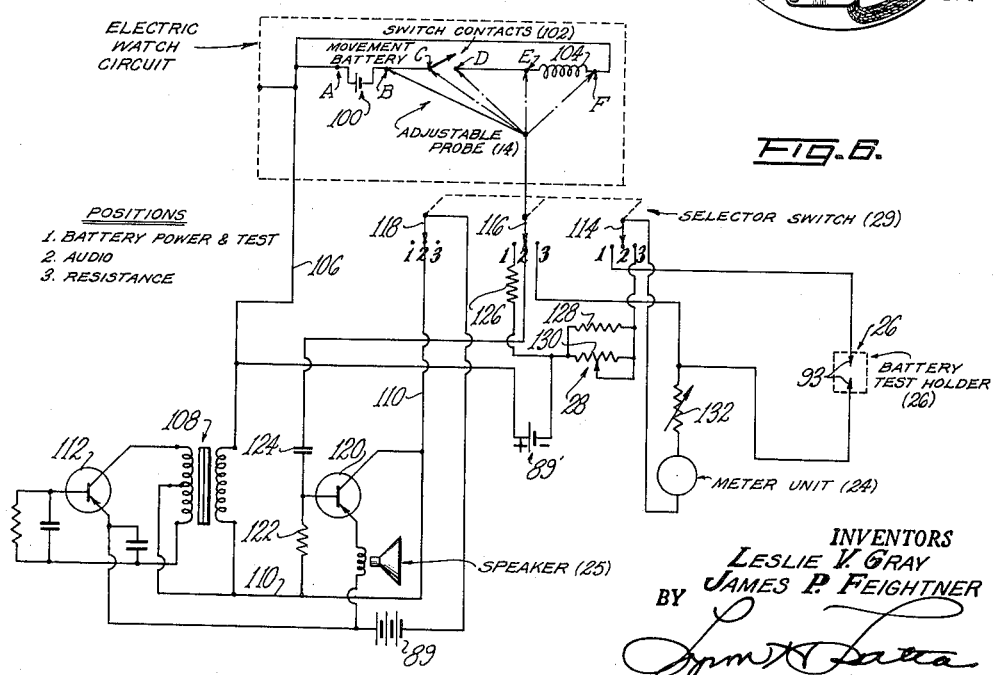

United States Patent Office 3,038,121
Patented June 5, 1962

3,038,121
ELECTRIC WATCH ANALYZER
Leslie V. Gray, 3867 Culver Center St., Culver City, Calif., and James P. Feightner, P.O. Box 134, Grass Valley, Calif.
Filed Aug. 1, 1960, Ser. No. 46,776
8 Claims. (Cl. 324—157)

This invention relates to an electric watch analyzer for use by jewelers and other watch service men in checking various operating conditions and functions of an electric watch such as the Hamilton Electric Watch. A general object of the invention is to provide, in a unit apparatus, means for determining the condition of all of the important functional parts and operating characteristics of such an electric watch.

More specifically, the invention aims to provide, in a unit apparatus, means for (1) checking the voltage of the watch energy cell; (2) checking the resistance of the induction of the watch; (3) accurately determining the range of make and break operation of the electric contacts, i.e. the angular positions of the balance wheel where make and break occur; (4) determining the degree of efficiency of electrical contact when the contacts are closed, efficiency of make and break operation, freedom from "noisy" contact operation etc.

A further object is to provide an apparatus comprising, in general, an indicator unit including both visible and audible indicator devices and means for switching to various testing functions, together with a watch holder and detector unit which is electrically connected to the indicator unit and includes improved means for holding the movement of an electric watch and for establishing electrical contact to various functional parts thereof for sensing and detecting operating conditions thereof and for transmitting to the indicator unit, signals which are interpreted and amplified and utilized by the indicator unit for giving both audible and visual indications of the conditions detected by the detector unit.

A further obeject is to provide such an apparatus which is adapted to indicate operating conditions of a watch in a manner such that the service man can readily read and interpret the indications.

A further object is to provide such an apparatus which is self contained, compact and extremely portable.

Another object is to provide such an apparatus which is adapted to supply power to the watch in the testing operations.

Another object is to provide such an apparatus having a detector unit provided with watch holder means adjustable for adaptation to a range of shapes and sizes in watches.

Still another object is to provide such an apparatus which can be utilized in testing wall clocks operating on 1½ volt batteries.

A further object is to provide such an apparatus having an extremely simple and inexpensive yet very effective test probe.

A further object is to provide such an apparatus having means for simultaneously holding an electric watch or its movement while simultaneously applying electric power to the movement for actuating the same and applying electric power for audible and visual indication of test results.

Other objects and advantages will become apparent in the ensuing specification and appended drawing in which:

FIG. 1 is a front elevational view of an electric watch analyzer apparatus embodying my invention;

FIG. 2 is a longitudinal sectional view of the same;

FIG. 3 is a plan view of the detector unit;

FIG. 4 is an end elevational view of the detector unit;

FIG. 5 is a perspective view of the indicator unit with its base section removed;

FIG. 6 is a schematic diagram of the electrical apparatus of the indicator unit; and FIG. 7 is a plan view of a Hamilton Electric Watch with cover removed and with phantom illustration of various test-probe positions in testing various parts thereof.

GENERAL DESCRIPTION

Referring now to the drawings in detail, and in particular to FIGS. 1–4, I have shown therein, as an example of one form in which the invention may be embodied, a detector unit 8 and an indicator unit 9. In general, the detector unit 8 comprises a base 10; holder means 11 including means for holding an electric watch at 12 and other means for holding the watch movement at 13; and a probe unit 14 which is mounted in the base 10 by an insulator mounting and has an electrical connection to a center contact of a plug type double contact terminal 15 through which a ground connection can be established through the base 10 from the watch case or the frame of the watch movement while a second connection is established from the probe 14 through the center contact of the terminal unit 15.

In general, the indicator unit 9 comprises a two-part case including a base section 20 and a cover section 21 upon which most of the electrical components of the indicator unit 9 are mounted (see FIG. 5); a connector cable 22 having a terminal plug 23 for coupling to the terminal 15; an indicating volt-ohmmeter unit 24 for visual indication and which may be calibrated in volts and in kilo-ohms; a speaker unit 25 for audible indication; a holder unit 26 for holding a battery cell 27 during testing thereof; an adjustment control 28 for the meter 24; a selector switch 29 for adjusting the indicator unit 9 for the several indicator operations thereof; and a two-prod test lead unit 30.

DETAILED DESCRIPTION—DETECTOR UNIT 8

Referring now to FIGS. 1–4, the base 10 is of metallic or other conductive material, is hollow, and comprises an elongated rectangular supporting skirt 31 and an integral horizontal web 32 at the top thereof. In a central opening in web 32 is received the upwardly projecting cylindrical collar 33 of a flat mounting clip 34 which embraces an insulator washer 35 and is secured to the underside of web 32 by rivets 36 extending upwardly through the channeled periphery of clip 34 and through the washer 35 and web 32. Mounted within collar 33 is a cylindrical insulator bushing 37. An inturned flange on the upper edge of collar 33 engages the upper end of bushing 37 and clamps it downwardly against a radial flange on the upper end of a tubular contact bushing 38 which extends through the center of washer 35. At its lower end, contact bushing 38 has a laterally bent integral connector tab 39.

Mounted in the contact bushing 38 is the cylindrical shank 40 of a probe post which has a reduced stem 41 projecting upwardly from a shoulder flange 42 at the upper end of shank 40. An insulator washer 43 is seated upon shoulder flange 42. A jacket 44 of generally cylindrical form encloses the washer 43, and has a downwardly extending skirt portion which is divided by vertical slits 45 into a series of spring fingers 46 which embrace and yieldingly grasp the upwardly projecting portion of collar 33 above web 32. Jacket 44 has a crown portion 47 of reduced diameter, which is joined to the central body 44 of the jacket by a shoulder which seats on top of the washer 43, and is vertically slitted to provide a series of spring fingers of arcuate cross section embracing and holding an insulator sleeve 48 of impregnated woven fabric material which sheaths the stem 41 of the probe post.

*Probe.*—The probe 14 comprises a shaft 50 which may be a length of spring brass wire or other metal of equivalent conductivity and stiffness, a handle 51 (which may be of plastic material) attached to one end thereof, a probe finger 52 of finer wire spot welded to the other end of shaft 50, and an insulator sleeve 53 of soft, elastic tubing of thermoplastic resin material covering the forward end of shaft 50, the rear end of probe finger 52, and the joint between the finger and shaft.

Shaft 50 is pivotally connected to a ball 54 on the upper end of stem 41, by means of a clasp of double yoke form, fabricated from a length of spring brass wire or equivalent, having respective laterally spaced yoke portions 55 joined at their rear end by a connecting loop 56 which is tightly coiled around shaft 50 just rearwardly of ball 54, and each having at its forward end a loop 57 coiled around the shaft 50 adjacent the rear end of the insulator sleeve 53. The yoke members 55 have, intermediate their ends, respective circular loops 58 which are spring pressed against the respective sides of ball 54 with a socketing effect which pivotally connects the probe 14 to the probe post. The spring pressure of the loops 58 against the ball 54 is sufficient to provide a frictional gripping effect which holds the probe in any position to which it is adjusted.

The terminal unit 15 includes a tubular shell 60 which may be lined with a tubular liner 61 of insulating material of cup-shape, a central terminal 62 projecting through the bottom of the liner 61, a back flange 63 integral with collar 60 and mounted against the inner face of an end portion of skirt 31, and a split-ring clamp portion 64 lined with an insulator sleeve (not shown) and supporting a connector tab 65 attached to the inner end of terminal 62, the tab 65 being connected by a conductor 66 to the connector tab 39.

*Watch holder clamp parts.*—The watch holder unit 11 includes a pair of drawbars 67 slidably extended through aligned apertures in the respective end members of base skirt 31 in positions laterally spaced on respective sides of the central assembly of probe supporting parts 35, 40 etc., and having at their forward ends, integral upwardly bent jaws 68. The rear ends of drawbars 67 are secured in the respective ends of a bridging yoke 69 which has at its respective ends, laterally spaced claws 70 for engaging one side of a watch case. Yoke 69 may be secured to the rear ends of drawbars 67 by means of cap screws 67′ threaded through apertures in the respective ends of the yoke and into the rear ends of the respective drawbars. Arranged on opposite sides of the probe unit 14 are a pair of jaws 71 each having at its rear end an upwardly projecting claw 72 in opposed relation to a respective claw 70 and each having a forward end in opposed relation to a respective jaw 68 and provided with a shoulder notch 73 horizontally opposed to a corresponding shoulder notch 73′ in the upper end of the respective jaw 68. The four shouldered notches 73, 73′ of the laterally spaced pairs of jaws 68 and 71 are adapted to engage the periphery of a watch movement 13 of circular disc form at four points spaced circumfrentially and symmetrically on opposite sides of the median vertical longitudinal plane of the detector unit A as indicated in FIG. 2, so as to securely position and hold the movement 13 in a horizontal plane. The claws 70 and 72 at the rear end of the detector unit A are likewise adapted to engage the periphery of a watch case 12 at four points spaced circumferentially and symmetrically on opposite sides of said median plane, the claws 70 and 72 have opposed V-shaped recesses for cradling engagement of the periphery of the watch case. Each of the jaw members 71 is in the form of an angle bracket having at its lower extremity a right-angled flange 74 secured against the upper face of base webs 32 by screws 74′ with the jaw members 71 projecting upwardly in laterally spaced parallel vertical planes.

*Clamp actuator.*—Disposed between the rear end portions of drawbars 67 where they project from the rear end of case 10, and in the common plane of drawbars 67, is an actuator screw shaft 75 which extends through an internally threaded aperture in the center of yoke 69 and meshes with the internal threads thereof so that the yoke functions as a follower nut. The forward end of screw shaft 75 is freely rotatably in an aperture in the rear end member of base skirt 31 and has a head 76 bearing against the inner face of said rear end member. A nut 77, threaded upon screw shaft 75 adjacent the outer face of the said rear end member of skirt 31, functions both as an abutment member, cooperating with head 76 to hold the screw shaft 75 against said longitudinal movement while the shaft is being rotated to adjust the position of yoke 69, and also as a locknut for locking the screw shaft 75 against rotation after it has been operated to adjust the yoke 69 to a selected position of adjustment. A handle 78 is secured to the rear end of the screw shaft 75, for actuation thereof.

DETAILED DESCRIPTION—INDICATOR UNIT B

Referring now to FIGS. 1 and 5, the indicator case comprises the cover section 21, which is of sheet material (preferably metal), bent into rectangular yoke form to provide a pair of opposed parallel front and rear wall panels 80 and 81 and a bridging top panel 82.

The bottom unit 20 includes a bottom panel 83, laterally spaced vertical side panels 84, and front and rear attachment flanges 85.

The front panel 80 has an opening to receive the ohmmeter 24 which has a dial and pointer assembly 24′ as its front portion. Below this opening is an opening 86 for the speaker 25 which is secured to the rear face of panel 80 as indicated. Also secured to the rear face of panel 80 is the switch 29 which is a three-position, three-bladed rotary switch. Switch 29 has a shaft passing through panel 80 and provided with an actuator knob 87 of pointer form which cooperates with indicator numerals "1," "2," and "3" respectively on an indicator plate 88 secured to the front face of the case, these indicator numerals designating, respectively, battery, audio and resistance (as measured on ohmmeter 24). Corresponding to these three positions, there are provided a number of sub-circuits for (1) battery power testing; (2) audio testing of various selected components of the watch; and (3) resistance testing of selected components of the watch, with attendant visual indication on ohmmeter 24.

Mounted upon the top panel 82 and rear end panel 81 of the case are pairs of dry cell flashlight batteries 81, 89′, the former being connected into a circuit for actuating speaker 25 and the battery 89′ being connected into a circuit for energizing the ohmmeter 24 and the watch movement (when the watch is mounted in the detector unit 8). The various circuit components which will now be described are packaged in a container 90 mounted upon the top panel 82 of the case.

The battery testing holder 26, as best shown in FIG. 5, comprises a bracket 91 of insulating material secured externally to the front panel 80 and having vertically spaced jaws 92 adapted to receive between them the small circular tablet form dry cell battery of the electric watch. Extending through the tips of jaws 92 are respective terminals 93 which, through binding posts 94 extending through case panel 80 and insulated therefrom, are connected into the test circuit.

*Dual prod lead unit 30.*—This unit includes a plug 95 insertible in holder 26 and having on its respective sides, contacts 95′ for connection with terminals 93. Leads 99, with prods 99′ at their ends, are connected to respective contacts 95′. For this test, the plug 95 is inserted into battery holder 26 to connect leads 99 to the test components of indicator unit 9, and prods 99′ are engaged respectively against contact points A and C of the watch across the battery 100.

*Selector switch.*—As indicated schematically in FIG. 6, selector switch 29 has three separate movable contacts or wipers 114, 116, and 118 respectively. Each of these wipers has the three positions, 1, 2 and 3 previously mentioned, and for each of these three positions there are a series of three fixed contacts, two of which, for the wiper 118, are dead contacts as indicated. The wipers 114—118 are mounted on the common shaft of the switch for rotation in unison as schematically indicated in FIG. 6, and all three wipers will be simultaneously positioned at the No. 1 position, the No. 2 position or the No. 3 position depending upon the adjustment of knob 87 (FIGS. 1 and 5).

TEST CIRCUITS

The transistorized test circuit for the electric watch analyzer is illustrated in FIGURE 6. The holder means 11 for the watch or movement being tested is indicated in FIGURE 6 by the dotted rectangle. The electric watch circuit to be tested includes a battery 100 which may be removed and placed in the battery test holder 26, as explained above.

One terminal A of the battery 100 is connected to the frame of the holder 11, and a second terminal B of the battery is connected to one terminal C of a pair of switch contacts 102. The switch contacts 102 are controlled by the balance wheel of the watch. The other terminal D of the switch contacts 102 is connected to a terminal E of a coil 104 which is included in the watch mechanism. The other terminal F of the coil 104 is connected back to the terminal A of the battery 100. The adjustable probe 14 is manually controllable, in the manner described above, to establish contact with any one of the terminal points A, B, C, D, E or F.

A lead 106 connects the frame of the holder 11 to one side of the secondary winding of a transformer 108. The other side of the secondary is connected to a lead 110. A suitable PNP transistor 112 is connected in circuit with the primary winding of the transformer 108. When this circuit is completed, an audio frequency tuned oscillator circuit is formed.

As indicated schematically in FIGURE 6, the selector switch 29 has three separate movable contacts 114, 116 and 118, and these are mechanically coupled to one another for uni-control. Each of the movable contacts 114, 116 and 118 selectively engages three fixed contacts, corresponding to the three positions of the selector switch 29. These fixed contacts are designated 1, 2 and 3, respectively. The selector switch 29 may be, for example, a known type of wafer switch having the movable contacts 114, 116 and 118 mounted on a common shaft.

The battery 89 has one terminal connected to the movable contact 118 of the selector switch 29, and the fixed contact 2 associated with that movable contact is connected to the common lead 110. The fixed contacts 1 and 3 associated with the movable contact 118 are open circuited. The other terminal of the battery 89 is connected back to the emitter of the oscillator transistor 112 and to one terminal of the voice coil of the speaker 25.

The other terminal of the voice coil of the speaker 25 is connected to the emitter of a transistor 120. This latter transistor may also be a PNP transistor of any suitable known type, and it is connected to serve as an amplifier. The collector of the transistor 120 is connected to the common lead 110, and the base of the transistor is connected to the junction of a resistor 122 and a capacitor 124. The resistor 122 is connected to the common lead 110, and the capacitor 124 is connected to the fixed contact 2 associated with the armature 116 of the selector switch 29.

The battery 89' has its positive terminal connected to the lead 106, and the negative terminal of the battery is connected to a resistor 126 and to the junction of a resistor 128 and a potentiometer 130. The resistor 126 may have a resistance of 180 ohms, for example, and it is connected to the fixed contact 1 associated with the movable contact 116 of the selector switch 29. The resistor 128 may have a resistance of 560 ohms, for example, and the potentiometer 130 may have a resistance of 25 kiloohms. The potentiometer 130 may form the ohmmeter adjustment control 28 referred to above.

The potentiometer 130 and the resistor 128 are connected to the fixed contact 3 associated with the movable contact 114 of the selector switch 29. The fixed contact 2 associated with that movable contact is open circuited, and the fixed contact 1 is connected to one terminal of the battery test holder 26. The other terminal of the battery test holder is connected to a variable resistor 132 which, in turn, is connected to the meter unit 24. This resistor serves as a voltmeter adjustment for the meter.

The other terminal of the meter 24 is connected to the movable contact 114 of the selector switch 29. The latter terminal of the battery test holder 26 is also connected to the fixed contact 3 associated with the movable contact 116 of the selector switch.

Battery Test

For this test, the battery 100 may be removed from the watch and placed in the holder 26. The selector switch 29 is then turned to position No. 1, at which its movable contact 114 engages the corresponding fixed contact 1. This engagement serves to connect the meter 24 and the variable resistor 132 in series across the battery. The meter 24 now funtions as a voltmeter, and voltage readings may be made from the voltage scale in FIGURE 1. For example, a new battery should read 1.45 volts, or better, for a typical present day model electric watch.

Movement Check

The movement of the watch may be checked with power supplied by the analyzer. For this purpose the selector switch 29 is moved to position No. 2. The battery 100 is removed from the watch, and the adjustable probe 14 is set to make electrical contact with terminal point B. The balance wheel of the watch is then turned until the switch contacts 102 close.

The oscillator circuit of the transistor 112 is now completed through the fixed contact 2 and movable contact 118 of the selector switch 29. Also, the oscillator is coupled to the amplifier circuit of the transistor 120 through the lead 106 to the terminal point A, through the coil 104 and the closed switch contacts 102 to the probe-contacting terminal point B, through the movable contact 116 and fixed contact 2 of the selector switch 29, and through the capacitor 124 to the base of the transistor 120. An amplified tone signal is produced, therefore, by the speaker 25. If no tone occurs, a malfunction in the corresponding circuit elements of the watch is indicated.

Running Check

For this test, the selector switch 29 is returned to position No. 1, and the test probe 14 is set to contact the terminal point B. This places the battery 89' in the watch circuit; the positive terminal being connected to the terminal point A by way of the lead 106, and the negative terminal being connected to the terminal point B through the resistor 126 and through the movable contact 116 and the probe 14.

By inducing motion in the balance wheel of the watch, the movement now should run and the balance wheel can be observed to see that it exhibits the proper angular reciprocal motion of, for example, 1¼ turns in the dial position; and 1⅛ turns in the pendant position.

Checking Contact Opening and Closing

Again with the watch battery 100 removed, the selector switch 29 is placed in the No. 2 position, and the probe 14 is again placed in electrical contact with the terminal point B. Now the balance wheel may be turned manually to cause the switch contacts 102 to open and close, and its angular positions at which the contacts are opened and closed may be determined.

Contact closing of the switch contacts 102 is indicated by the start of the tone in the speaker 25, and contact opening of the switch contacts is indicated by the termination of the tone. By a slow manual rotation of the balance wheel through the period that the contacts 102 are closed, any significant intermittent opening and closing of the contacts will be indicated by a scratching or change in the audio tone.

*Checking the Coil*

To check the coil 104 of the watch, the selector switch 29 is set to its position No. 3, and the meter unit 24 is used as an ohmmeter. The battery 100 is removed from the watch, and the movable probe 14 is first set to the terminal point A.

One side of the meter unit 24 is now connected to the terminal point A through the variable resistor 132, and through the movable contact 116 and the probe 14. The other side of the meter unit 24 is connected to the negative terminal of the battery 89' through the movable contact 114, potentiometer 130 and shunting resistor 128. The positive terminal of the battery 89' is connected to the terminal point A by way of the lead 106 to complete the circuit.

The circuit traced in the preceding paragraph results in an ohmmeter circuit in which zero resistance is measured by the probe 14 at the point A. The control 28 is now adjusted to shift the armature of the potentiometer 130 and cause the meter 24 to read 0 ohms on its ohmmeter scale in FIGURE 1. After the meter 24 has been so "zeroed," the resistance of the coil 104 can now be measured, this being achieved by moving the probe 14 to the terminal point E.

The meter should indicate a coil resistance of, for example, between 2700 and 3500 ohms. Malfunctions are indicated when the meter indicates open circuit in the coil, or zero coil resistance.

The tests described above are but several of many different tests that can be carried out by the analyzer of the invention in testing the circuit and components of an electric watch.

We claim:

1. In an analyzer for an electric watch having elements including a frame, a wafer battery, an exciter coil, a balance wheel, and make and break contacts, in combination: a detector unit including a watch holder to hold said watch and to establish a ground connection to said frame, and a probe insulated from said holder and adapted to selectively establish contact to any one of said watch elements while holding said watch; an indicator unit including a tuned audio-frequency oscillator circuit, a speaker, a current source having one side thereof connected to said speaker and oscillator circuit, a voltmeter-ohmmeter, a variable-resistance controller therefor, and a selector switch having a plurality of movable contacts; a pair of conductor leads for connecting said indicator unit to said detector unit, one of said leads providing a connection between said watch holder and said oscillator circuit and the other of said leads providing a connection between said probe and one of said movable contacts; said one movable contact being adapted, in one position of the switch, to connect said probe to said oscillator circuit, and in an alternate position of said switch, to connect said probe to said variable resistance controller; another of said movable contacts being adapted, in said one position of the switch, to connect the other side of said current source to said oscillator circuit and speaker for establishing therefor, an audible signal circuit responsive to operations of said make and break contacts of said watch; and the remaining movable contact being adapted, in said alternate position, to connect said controller to said voltmeter-ohmmeter, for measuring electrical characteristics of said watch elements.

2. An analyzer as defined in claim 1, including a test holder for said battery on said indicator unit; and wherein said remaining movable contact is arranged, in still another position of a switch, to connect said battery holder to said voltmeter-ohmmeter.

3. In an analyzer for an electric watch having elements including a frame, a wafer battery, an exciter coil, a balance wheel, and make and break contacts, in combination: a detector unit including a watch holder to hold said watch and establish a ground connection to said frame, and a probe insulated from said holder and adapted to selectively establish contact to any one either of said watch elements while holding said watch; an indicator circuit including a tuned audio-frequency oscillator circuit, a speaker, a current source having one side thereof connected to said speaker and oscillator circuit, a voltmeter-ohmmeter, a variable-resistance controller therefor, and a selector switch having a plurality of movable contacts; a pair of conductor leads for connecting said indicator unit to said detector unit, one of said leads providing a connection between said watch holder and said oscillator circuit and the other of said leads providing a connection between said probe and one of said movable contacts; a test holder for said battery; said one movable contact being adapted, in first, second and third positions of said switch respectively, to connect said probe to said controller, to said oscillator circuit and speaker, and to said voltmeter-ohmmeter; another of said movable contacts being adapted, in said second position of the switch, to connect the other side of said current source to said oscillator and speaker for audible signal operation in response to operations of said make and break watch elements; and still another of said movable contacts being adapted, in the first and third positions of said switch respectively, to connect said voltmeter-ohmmeter to said test holder and to the other side of said controller respectively.

4. Apparatus as defined in claim 3, including a two-lead conductor unit having at one end a pair of test prods, and having at its other end, a plug provided on its opposite sides with electric contacts cooperable with said battery test holder to establish connections therefrom to the respective test prods, the latter being operable for testing said battery when in the watch.

5. Apparatus as defined in claim 4, wherein said test prods are further operable for testing said current source in said indicator unit.

6. In an analyzer for an electric watch having elements including a frame and a wafer battery, in combination: a detector unit including a watch holder to hold said watch and establish a ground connection to said frame, and a probe insulated from said holder and adapted to selectively establish contact to either of said watch elements while holding said watch; an indicator unit including test holder for said battery, a voltmeter-ohmmeter, a variable-resistance controller therefor, and a selector switch having a plurality of movable contacts; a pair of conductor leads for connecting said indicator unit to said detector unit, one of said leads providing a connection between said watch holder and said oscillator circuit and the other of said leads providing a connection between said probe and one of said movable contacts; a two-lead conductor unit having at one end a pair of test prods, and having, at its other end, a plug provided on its opposite sides with electric contacts cooperable with said battery test holder to establish connections therefrom to the respective test prods, said one movable contact being adapted, in one position of the switch, to connect said probe to said voltmeter-ohmmeter, and in an alternate position of said switch, to connect said probe to said variable resistance controller; and another of said movable contacts being adapted, in said one position of the switch, to connect said controller to said voltmeter-ohmmeter, for measuring said watch battery in said detector unit by use of said two-lead conductor unit, and adapted in said alternate position of the switch, to connect said voltmeter-ohmmeter to said test holder for testing said battery therein.

7. In an analyzer for an electric watch having elements including a frame, a wafer battery, and exciter coil and a balance wheel provided with a make and break contact, in combination: a detector unit including a base having a top web and a peripheral skirt, a post projecting vertically through said top web, annular insulator means in said top web, in which said post is mounted and through which it extends, a probe including a shaft having at one end a handle and at its opposite end a probe whisker and, intermediate its ends, a universally pivotal connection to the upper end of said post, an electrical connector in said skirt, including a terminal insulated from said base and connected to said post beneath said web, a watch holder on one end of said base, within the sweep path of said whisker, to hold said watch and establish a ground connection to said frame, said probe being adapted to selectively establish contact to any one of said watch elements while holding said watch; an indicator circuit including a tuned audio-frequency oscillator circuit, a speaker, a current source having one side thereof connected to said speaker and oscillator circuit, a voltmeter-ohmmeter, a variable-resistance controller therefor, and a selector switch having a plurality of movable contacts; a pair of conductor leads having connector means adapted to be coupled to said connector means of the base, for connecting said indicator unit to said detector unit, one of said leads providing a connection between said watch holder and said oscillator circuit and the other of said leads providing a connection between said probe and one of said movable contacts; said one movable contact being adapted, in one position of the switch, to connect said probe to said oscillator circuit, and in an alternate position of said switch, to connect said probe to said variable resistance controller; another of said movable contacts being adapted, in said one position of the switch, to connect the other side of said current source to said oscillator circuit and speaker for establishing therefor, an audible signal circuit responsive to probing operations of said probe upon said watch elements; and the remaining movable contact being adapted, in said alternate position, to connect said controller to said voltmeter-ohmmeter, for measuring electrical characteristics of said watch elements.

8. Apparatus as defined in claim 7, wherein said post has at its upper end an integral ball, and wherein said probe shaft has a pair of jaws of spring wire including circular socket elements embracing and receiving respective sides of said ball for establishing said universally pivotal connection.

References Cited in the file of this patent
UNITED STATES PATENTS
2,732,491    Jeannot _____ Jan. 24, 1956